US009403352B2

(12) United States Patent
Kurihara et al.

(10) Patent No.: US 9,403,352 B2
(45) Date of Patent: Aug. 2, 2016

(54) MANUFACTURING METHOD OF LABEL AND MEMBER FOR LABEL

(71) Applicant: FUJI XEROX CO., LTD., Tokyo (JP)

(72) Inventors: Eizo Kurihara, Kanagawa (JP); Katsumi Sakamaki, Kanagawa (JP); Shoji Yamaguchi, Kanagawa (JP); Seigo Makida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 272 days.

(21) Appl. No.: 13/746,945

(22) Filed: Jan. 22, 2013

(65) Prior Publication Data

US 2014/0044931 A1  Feb. 13, 2014

(30) Foreign Application Priority Data

Aug. 10, 2012  (JP) ................................ 2012-178666

(51) Int. Cl.
*B32B 41/00* (2006.01)
*B32B 3/10* (2006.01)
*G01V 15/00* (2006.01)

(52) U.S. Cl.
CPC . *B32B 41/00* (2013.01); *B32B 3/10* (2013.01); *G01V 15/00* (2013.01); *Y10T 29/49764* (2015.01); *Y10T 428/24802* (2015.01)

(58) Field of Classification Search
CPC .. B32B 3/10; B32B 38/1833; B32B 38/1841; B32B 38/185; B32B 41/00; B32B 2519/00; B32B 2519/02; B32B 2309/70; B32B 2309/72; B32B 2309/08; B32B 2309/10; B32B 2309/04; G01V 15/00; Y10T 29/49764; Y10T 428/24802

USPC .......................... 156/64, 368; 428/195.1, 611
See application file for complete search history.

(56) References Cited

U.S. PATENT DOCUMENTS

| 4,568,921 A * | 2/1986 | Pokalsky .................... 340/572.3 |
| 2002/0195194 A1* | 12/2002 | Grabau .............. G06K 17/0025 156/300 |
| 2006/0233995 A1* | 10/2006 | Garland ........................ 428/41.8 |
| 2007/0151660 A1* | 7/2007 | Adams ................... B31D 1/025 156/238 |

FOREIGN PATENT DOCUMENTS

| JP | S62-60331 U | 4/1987 |
| JP | H10-249963 A | 9/1998 |
| JP | 2005-231754 A | 9/2005 |

(Continued)

OTHER PUBLICATIONS

Jan. 6, 2016 Office Action issued in Korean Application No. 10-2013-0021803.

(Continued)

*Primary Examiner* — George Koch
(74) *Attorney, Agent, or Firm* — Oliff PLC

(57) ABSTRACT

Provided is a manufacturing method of a label, including configuring a member for a label so as to dispose a magnetic member between a base material and a covering material, cutting the magnetic member along with the base material so as to cut a label from the member for a label, removing an unnecessary portion of the base material from the member for a label, and detecting whether or not the label is present in the unnecessary portion of the base material or whether or not the label is present in the member for a label in which the unnecessary portion of the base material has been removed.

6 Claims, 8 Drawing Sheets

(56) References Cited

FOREIGN PATENT DOCUMENTS

| | | |
|---|---|---|
| JP | 2006-298431 A | 11/2006 |
| JP | A 2006-330967 | 12/2006 |
| JP | 2009-154945 A | 7/2009 |
| JP | 2010-234574 A | 10/2010 |
| KR | 20080031855 A | 4/2008 |
| WO | 2006/108269 A1 | 10/2006 |

OTHER PUBLICATIONS

Jan. 19, 2016 Office Action issued in Japanese Application No. 2012-178666.

* cited by examiner ical Field

The present invention relates to a manufacturing method of a label and a member for the label.

SUMMARY

According to an aspect of the invention, there is provided a manufacturing method of a label, including: configuring a member for a label so as to dispose a magnetic member between a base material and a covering material; cutting the magnetic member along with the base material so as to cut a label from the member for a label; removing an unnecessary portion of the base material from the member for a label; and detecting whether or not the label is present in the unnecessary portion of the base material or whether or not the label is present in the member for a label in which the unnecessary portion of the base material has been removed.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the invention will be described in detail with reference to drawings. In addition, for convenience of explanation, an arrow F which is appropriately included in each drawing indicates a transporting direction of a label paper main body 50 (label paper 60), and an arrow C indicates a direction (lateral direction) perpendicular to the transporting direction. Moreover, an arrow UP indicates an upwards direction. However, none of these directions is particularly limited. In addition, the upstream side in the transporting direction of the label paper main body 50 (label paper 60) may be simply referred to as upstream side, and the downstream side in the transporting direction may be simply referred to as downstream side.

Figure 1:
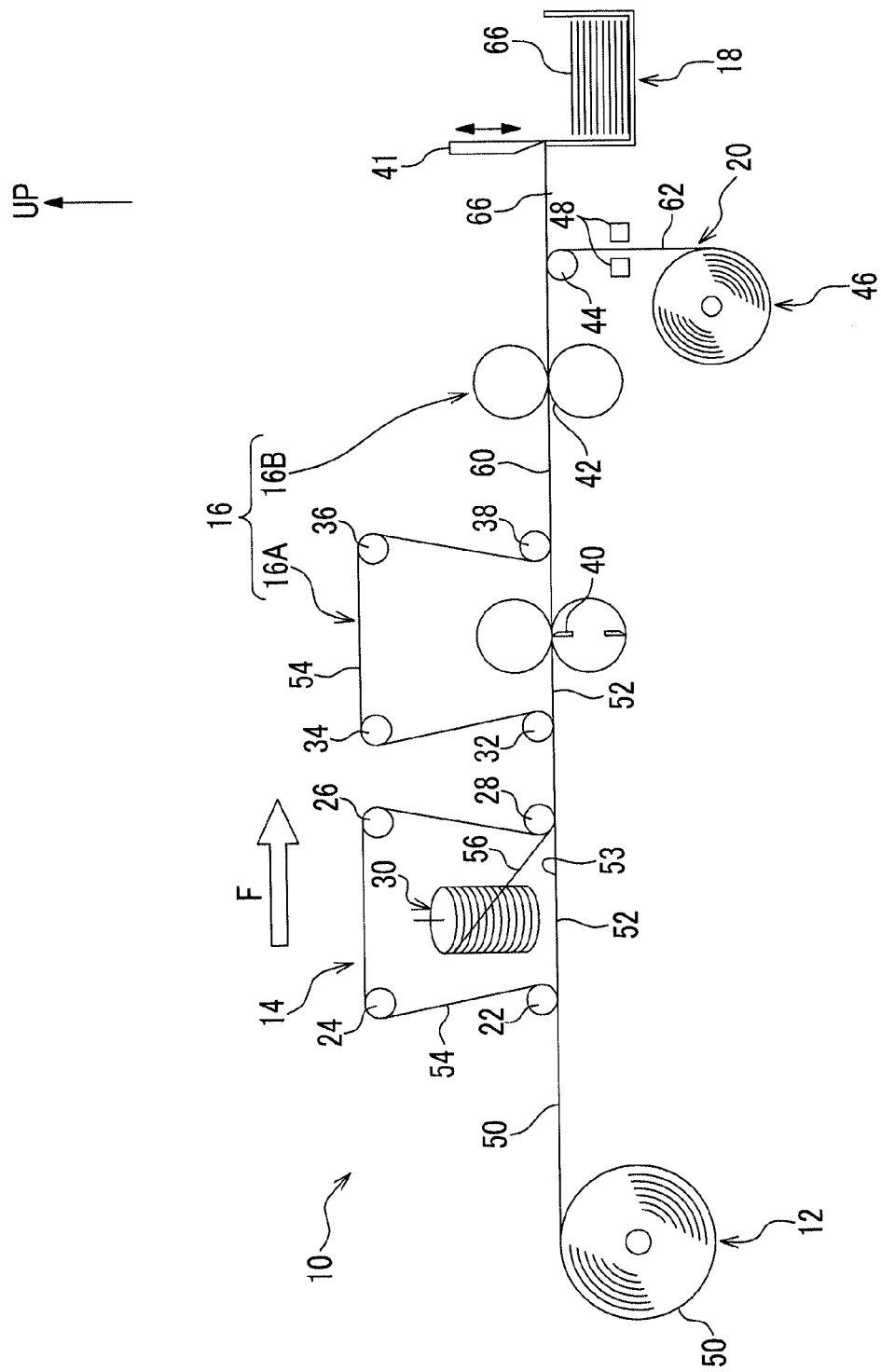
FIG. 1 is an explanatory view showing a schematic configuration of a label manufacturing apparatus.
Figure 2:
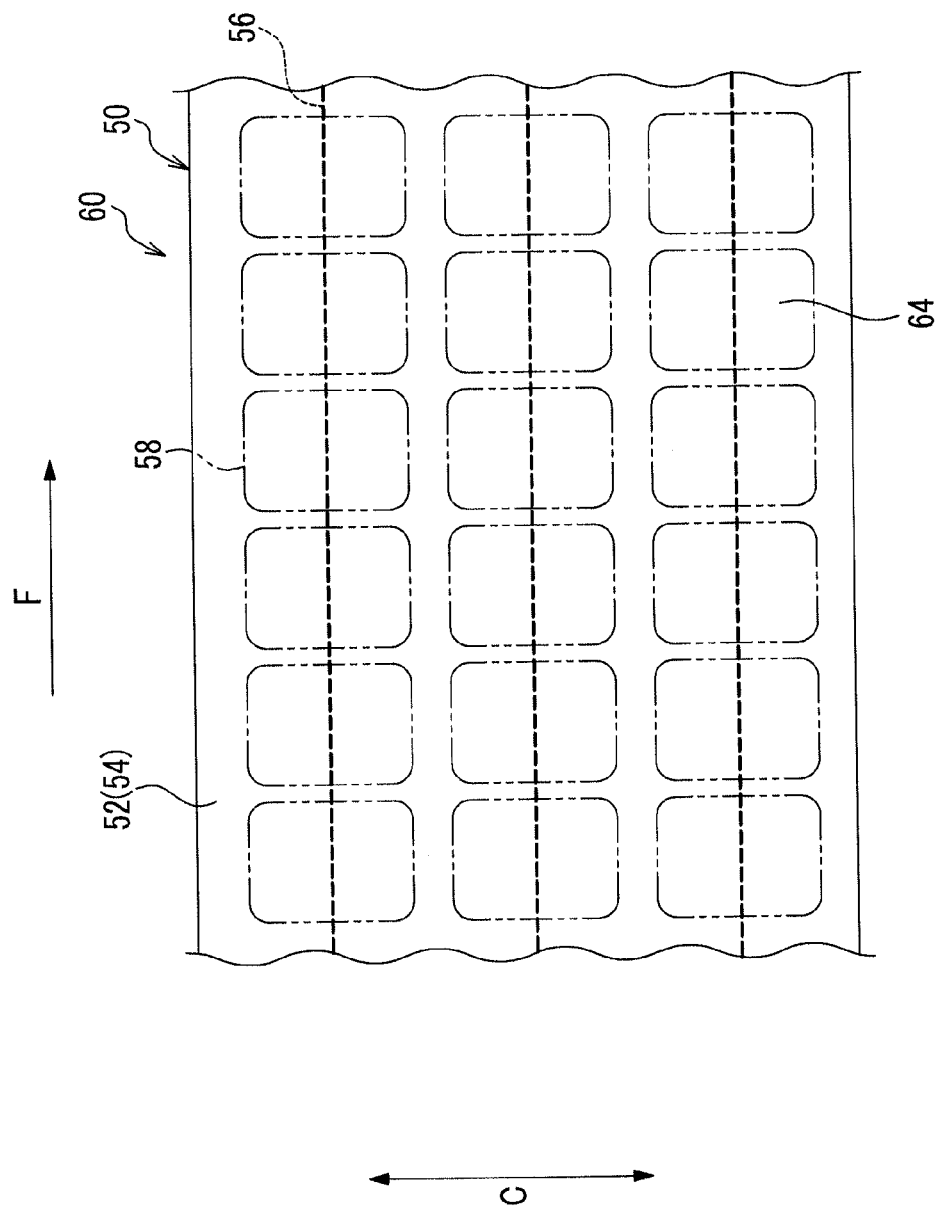
FIG. 2 is a plan view showing label paper.

As shown in FIG. 1, a label manufacturing apparatus 10 includes a feed portion 12 that supports so as to feed the label paper main body 50, an attaching portion 14 that supplies an amorphous magnetic wire 56 which is an example of a magnetic member having great Barkhausen effect to the label paper main body 50 fed from the feed portion 12, and configures label paper 60 which is an example of a member for a label.

Moreover, the label manufacturing apparatus 10 includes a cutting portion 16 that makes a cut for forming a label 64 (refer to FIG. 4) which is a product on the label paper 60, a removal portion 20 that removes an unnecessary portion 62 (refer to FIG. 4) that is not used for the label 64 from the label paper 60, and a recovery portion 18 that cuts the label paper 60 (a label assembly 66), in which the unnecessary portion 62 has been removed, for each predetermined length and recovers the cut label paper.

As shown in FIGS. 1 to 4, a base paper 52 which is an example of a base material having an adhesive layer 53 on one surface and a release paper 54 which is an example of a covering material are attached to each other using the adhesive layer 53, and thus, the label paper main body 50 is configured, is wound in a roll shape, and is supported on the feed portion 12. Moreover, the base material and the covering material may be formed of a non-magnetic material, for example, a paper material or the like. Therefore, in the present exemplary embodiment, the base paper 52 and the release paper 54 are adopted as an example.

In the attaching portion 14, the release paper 54 is temporarily peeled off from the adhesive layer 53 of the base paper 52, the amorphous magnetic wire 56 is supplied to the adhesive layer 53 of the base paper 52 and is attached, and thereafter, the release paper 54 is reattached to the adhesive layer 53 of the base paper 52. Specifically, the release paper 54 is wound around a guide roll 22 of the upstream side in the transporting direction of the base paper 52, and is transported to the upper side while being peeled off from the adhesive layer 53 of the base paper 52.

Moreover, in the upper side, the release paper 54 is wound around a guide roll 24, is guided in the transporting direction, is subsequently wound around a guide roll 26, and is guided to the lower side. The release paper 54 guided to the lower side is wound around a guide roll 28 of the downstream side in the transporting direction of the base paper 52.

The release paper 54 is reattached to the adhesive layer 53 of the base paper 52 while the amorphous magnetic wire 56 is interposed between the base paper 52 (adhesive layer 53) and the release paper 54 by the guide roll 28. In addition, in the attaching portion 14, an adjusting unit (not shown) that adjusts the transport length of the base paper 52 so as to correspond to the release paper 54 guided to the guide rolls 22, 24, 26, and 28 is disposed.

Moreover, the amorphous magnetic wires 56 are linearly supplied (disposed) along the transporting direction so as to pass through each of the centers (the center portions in the lateral direction of each label 64) of plural (plural rows: 3 rows in this case) label areas 58 (shown by a virtual line in FIG. 2) in the label paper main body 50. Therefore, a supply portion 30 (refer to FIG. 1) that supplies the amorphous magnetic wire 56 is provided in plural (three in this case) in a direction (lateral direction) perpendicular to the transporting direction.

Moreover, the label area 58 indicates an area which becomes the label 64 before being cut from the label paper 60

(base paper 52). However, the label area may indicate the area in which the label 64 has been removed in the unnecessary portion 62. In addition, the amorphous magnetic wire 56 is disposed between the base paper 52 (adhesive layer 53) and the release paper 54 of the label paper main body 50, which becomes label paper 60 (refer to FIG. 2).

Here, the existence of the amorphous magnetic wire 56 is detected due to a magnetostriction vibration, which is distinguished from a so-called magnetostrictor. Moreover, the amorphous magnetic wire is a known wire in which an absolute value of Saturation Magnetostriction Coefficient λs is 1 ppm or less, and has a property (great Barkhausen effect) in which magnetization reversal is repeated in response to an alternating field having low intensity.

Therefore, the change (magnetic signals) of the magnetic field generated due to the great Barkhausen effect is detected, and thus, an article (not shown) or the like to which the label 64 is attached being carried out illicitly from a security area (not shown) is detected.

Specifically, for example, a pair of gates (not shown) that includes an exciting coil is disposed so as to face each other in a gateway of a security area, and the alternating field having amplitude of a predetermined level (threshold Hp) or more is generated from the exciting coil. Thereafter, when the article passes through the gates, the magnetization reversal is periodically generated in the amorphous magnetic wire 56 in the label 64 that is attached to the article, an electric pulse (a magnetic signal) that is output according to the magnetization reversal is detected by a detection coil (not shown) (great Barkhausen effect is detected).

Therefore, according to a system in which warning sound or the like is generated from the gate or the like due to this detection, theft or careless carrying out of the article from the security area is psychologically prevented. Moreover, the Saturation Magnetostriction Coefficient λs is measured using Small-Angle Magnetization Rotation Method which is disclosed in Literature, IEEE Trans. Magn. MAG-16, P435 (1980); K. Narita, J. Yamazaki, and H. Fukunaga.

In addition, the amorphous magnetic wire 56 is a wire in which the diameter is approximately 30 μm to 45 μm and disposed between the base paper 52 (adhesive layer 53) and the release paper 54. However, in convenience of the explanation, in each drawing, the dimension (thickness) of the amorphous magnetic wire 56 is exaggeratedly shown.

As shown in FIG. 1, the cutting portion 16 includes a lateral cutting portion 16A in which the release paper 54 is peeled off from the adhesive layer 53 of the base paper 52 once again, the base paper 52 is cut in the direction (lateral direction) perpendicular to the transporting direction along with the amorphous magnetic wire 56, and thereafter, the release paper 54 is reattached to the adhesive layer 53 of the base paper 52, and a longitudinal cutting portion 16B in which only the base paper 52 of the label paper 60 is cut along the transporting direction (longitudinal direction).

In the lateral cutting portion 16A, the release paper 54 is wound around the guide roll 32 of the upstream side in transporting direction of the base paper 52 and is transported to the upper side while being peeled off from the adhesive layer 53 of the base paper 52. Moreover, in the upper side, the release paper 54 is wound around the guide roll 34 and guided in the transporting direction, subsequently, is wound around the guide roll 36 and guided to the lower side. The release paper 54 that is guided to the lower side is wound around the guide roll 38 of the downstream side in the transporting direction of the base paper 52.

On the other hand, in the downstream side of the guide roll 32 and the upstream side of the guide roll 38, a cutter 40 is disposed along the direction perpendicular to the transporting direction. Using the cutter 40, the base paper 52 is cut along with the amorphous magnetic wire 56 along a virtual line in the lateral direction (which includes a portion of an arc-shaped portion of a corner in the plan view) which defines each label area 58 (label 64) (refer to FIG. 3).

Figure 3:
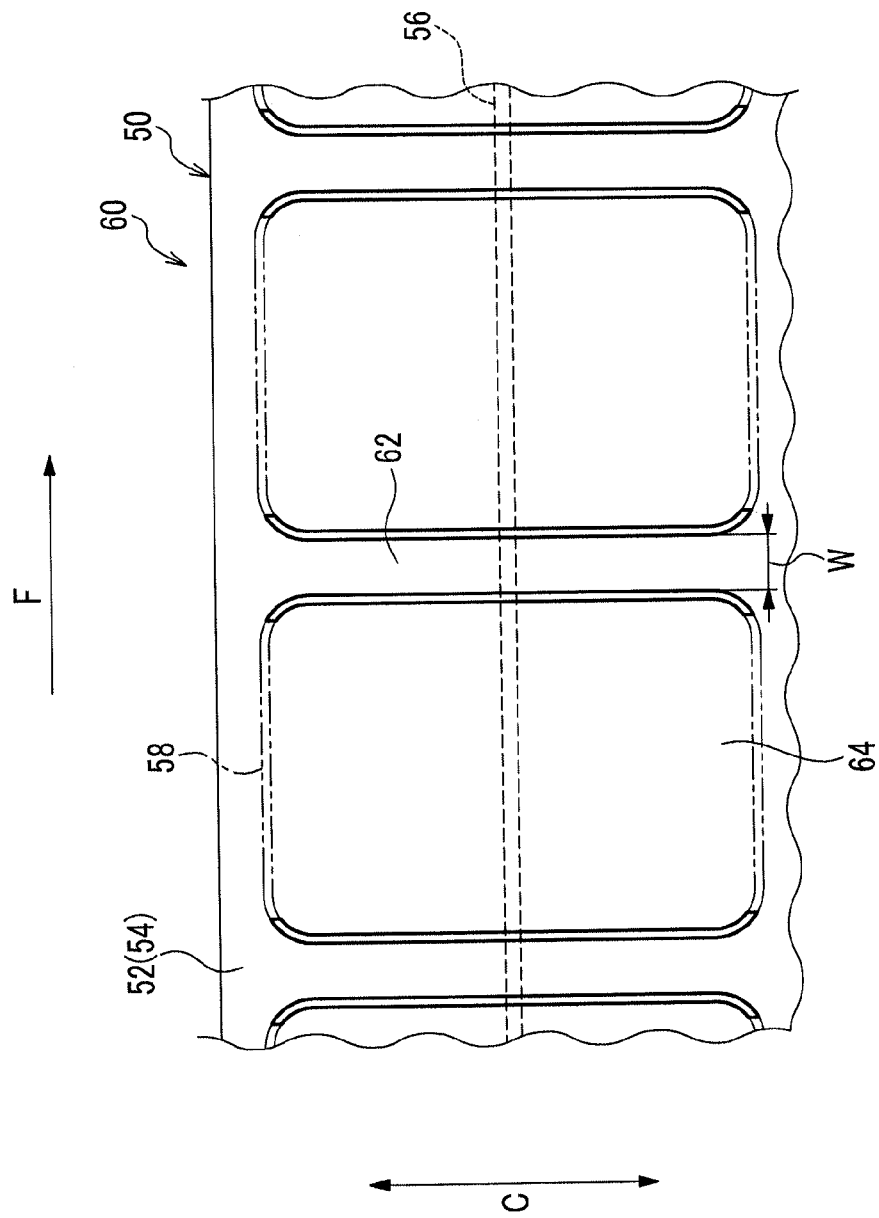
FIG. 3 is a plan view showing an enlarged portion of the label paper in which an amorphous magnetic wire is cut along with a base paper.

Moreover, as shown in FIG. 1, the release paper 54 is reattached to the base paper 52 (the adhesive layer 53), which is cut along the lateral direction along with the amorphous magnetic wire 56, by the guide roll 38. That is, the label paper 60 of the state shown in FIG. 3 is supplied to the longitudinal cutting portion 16B.

In addition, also in the lateral cutting portion 16A, an adjusting unit (not shown) that adjusts the transporting length of the base paper 52 corresponding to the release paper 54 that is guided to the guide rolls 32, 34, 36, and 38 is provided. Moreover, an interval W (refer to FIG. 3) between the adjacent labels 64 in the transporting direction may be 1 mm or more. If the interval W is less than 1 mm, there is a concern that the unnecessary portion 62 between the label 64 and the label 64 may be cut, and it is difficult to cut the release paper 54 between the label 64 and the label 64 using the cutter 41.

In the longitudinal cutting portion 16B, a cutter 42 is disposed along the transporting direction. Using the cutter 42, the base paper 52 is cut along a virtual line in the longitudinal direction (which also includes the remainder of the arc-shaped portion of the corner in the plan view) which defines each label area 58 (label 64). Moreover, the height position or the like of the cutter 42 with respect to the label paper 60 is adjusted so as to cut (so as not to cut the release paper 54) only the base paper 52 which is attached to the release paper 54.

As shown in FIG. 1, a cutter 41 that is configured so as to move vertically is provided in the recovery portion 18. Therefore, the label assembly 66 (release paper 54), in which the unnecessary portion 62 of the base paper 52 that is not used for the label 64 is peeled off from the release paper 54 and removed, is cut for each predetermined length using the cutter 41 and is recovered into the recovery portion 18. Moreover, as shown in FIG. 4, in the label assembly 66, plural labels 64 which are products are arranged on the release paper 54.

Figure 4:
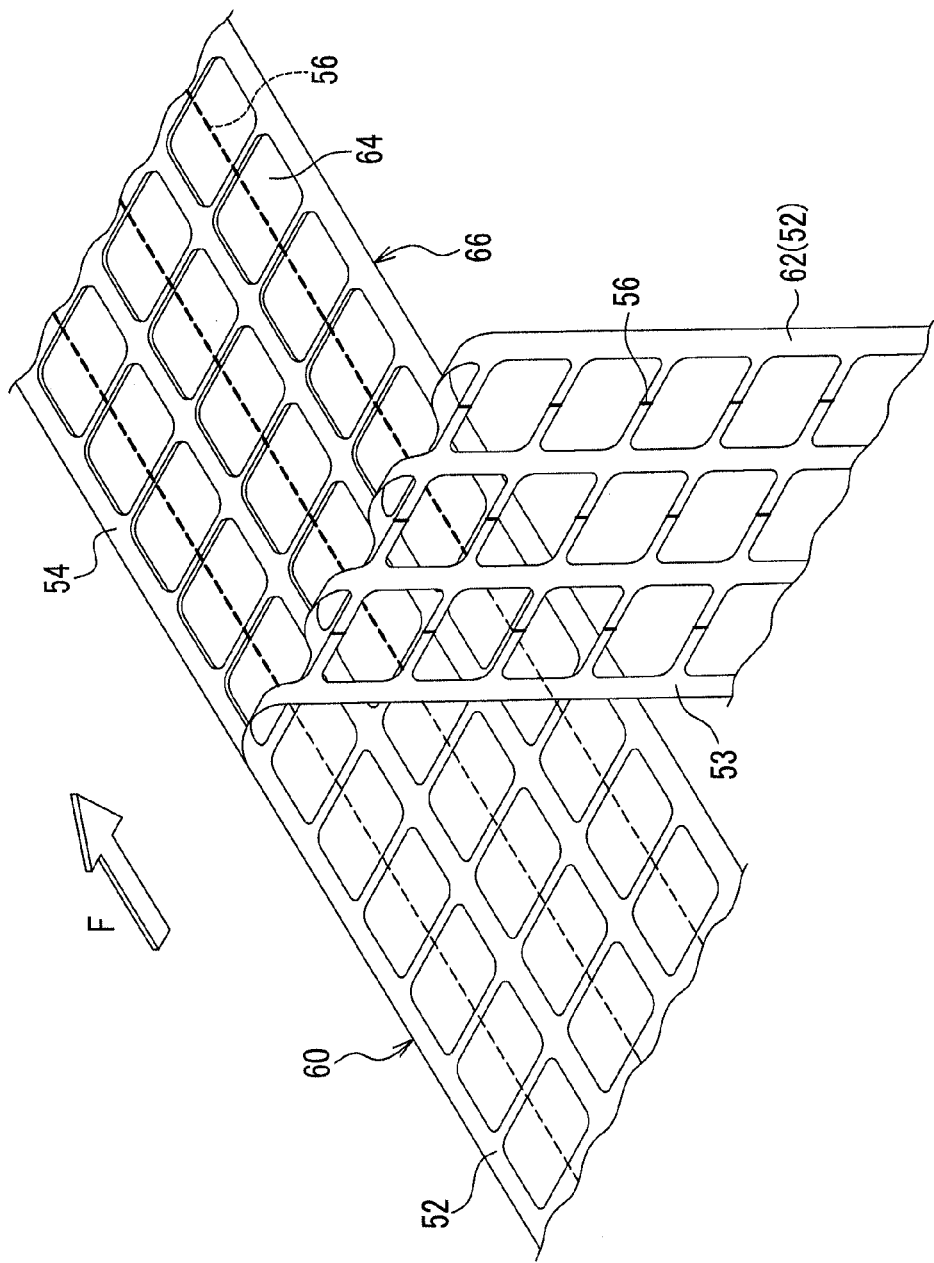
FIG. 4 is a perspective view showing a state where an unnecessary portion of the base paper is peeled off from the label paper.

As shown in FIGS. 1 and 4, in the removal portion 20, the unnecessary portion 62 of the base paper 52 that is not used for the label 64 is peeled off from the label paper 60 and has been removed. Specifically, a guide roll 44 that guides the unnecessary portion 62 of the base paper 52 to a winding portion 46 is provided in the removal portion 20, and the unnecessary portion 62 of the base paper 52 that is guided by the guide roll 44 is wound in a roll shape by the winding portion 46. In addition, the unnecessary portion 62 which is wound in a roll shape is separately recovered.

Figure 5:
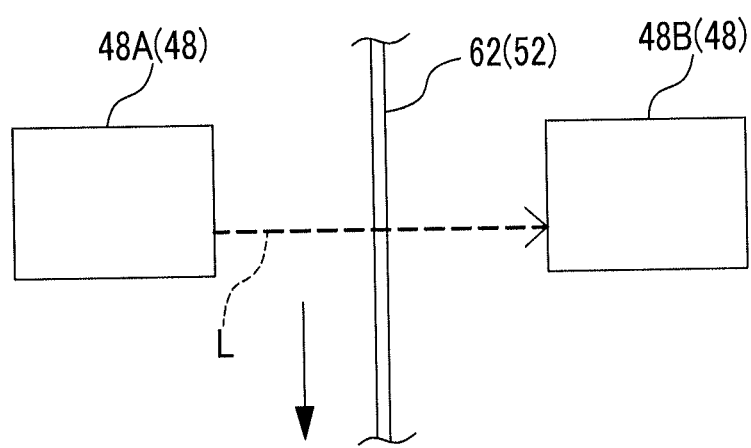
FIG. 5 is an explanatory view showing a state where a label area is detected using a laser sensor in the unnecessary portion of the base paper.

Moreover, while the unnecessary portion 62 of the base paper 52 is transported from the guide roll 44 to the winding portion 46, it is detected whether or not an error is present in the unnecessary portion 62 using a laser sensor 48 which is an example of a detecting unit. That is, as shown in FIG. 5, a light emitting portion 48A and a light receiving portion 48B of the laser sensor 48 are disposed in a position in which the label area 58 is interposed in the unnecessary portion 62 of the base paper 52.

Figure 6A:
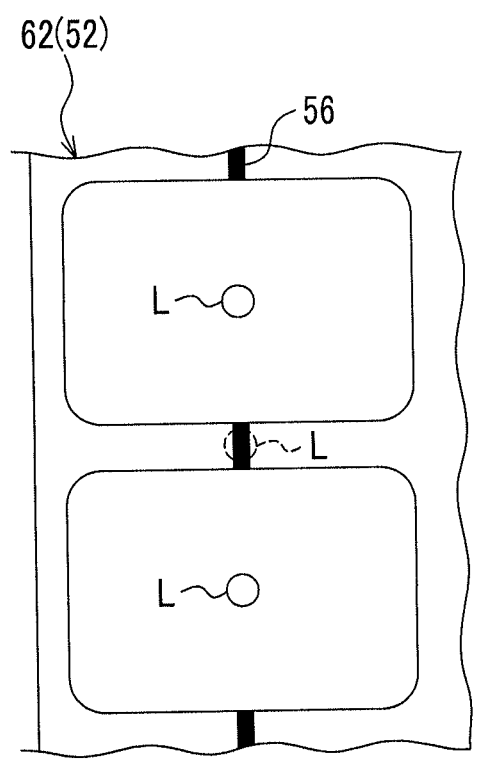
FIG. 6A is an explanatory view showing an OK state at the time of being detected using the laser sensor.

In addition, as shown in FIG. 6A, when the label 64 which is a product has been removed from the label area 58 in the unnecessary portion 62 of the base paper 52, since the light receiving portion 48B receives a laser light L that is radiated from the light emitting portion 48A in the label area 58 in which the label 64 has been removed, it is determined as an "OK state" in which a defective unit does not occur in the label assembly 66 which is recovered in the recovery portion 18, that is, it is determined that "there is no error".

Figure 6B:
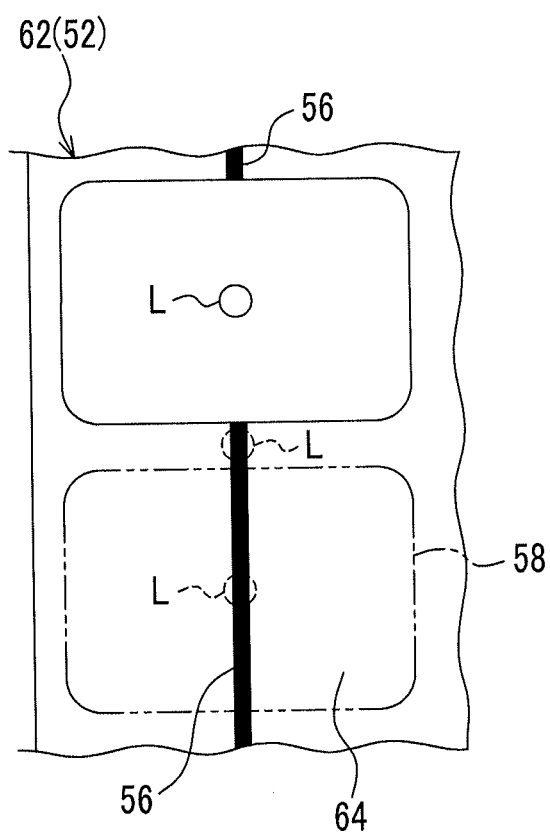
FIG. 6B is an explanatory view showing an unsatisfactory state at the time of being detected using the laser sensor.

On the other hand, as shown in FIG. 6B, when the label 64 which is a product is not removed and remains in the label area 58 in the unnecessary portion 62 of the base paper 52, since the laser light radiated from the light emitting portion 48A is blocked due to the remaining label 64 and the light receiving portion 48B does not receive the laser light, it is determined as an "unsatisfactory state" in which a defective unit occurs in the label assembly 66 which is recovered to the recovery portion 18, that is, it is determined that "there is an error".

In addition, when it is determined that "there is an error", the label manufacturing apparatus 10 is temporarily stopped, the label assembly 66 (at least a portion of the labels 64 is not present) which becomes the defective unit which is recovered on the uppermost layer of the recovery portion 18 is removed. Moreover, as a main factor why the label 64 remains in the unnecessary portion 62, cutting failure of the cutter 40 with respect to the amorphous magnetic wire 56 is considered.

Next, in the label manufacturing apparatus 10 configured as described above, the operation (the manufacturing method of the label 64) will be described.

First, the paper main body 50 of a label is fed from the feed portion 12 and is supplied to the attaching portion 14. In the label paper main body 50 that is supplied to the attaching portion 14, the release paper 54 is peeled off from the adhesive layer 53 of the base paper 52. Moreover, the release paper 54 that is peeled off from the adhesive layer 53 of the base paper 52 is guided to the guide roll 22, is wound around the guide rolls 24 and 26, and is further guided to the guide roll 28.

On the other hand, the amorphous magnetic wire 56 is supplied onto the adhesive layer 53 of the base paper 52, in which the release paper 54 is peeled off, at immediately before the guide roll 28. In addition, due to the guide roll 28, the amorphous magnetic wire 56 is attached to the adhesive layer 53 of the base paper 52 and the release paper 54 is attached onto the adhesive layer 53 (the amorphous magnetic wire 56) of the base paper 52.

Thereby, the label paper 60 (refer to FIG. 2) in which the amorphous magnetic wire 56 is disposed between the base paper 52 (adhesive layer 53) and the release paper 54 is manufactured (disposition process). Moreover, the supply portion 30 that supplies the amorphous magnetic wire 56 is provided in plural (three in this case) in the lateral direction, and the amorphous magnetic wires 56 are linearly supplied along the transporting direction respectively with respect to the center portions in the lateral direction of plural (plural rows: three rows in this case) label areas 58 (labels 64) in the label paper main body 50.

The label paper 60 that is manufactured in this way is transported to the lateral cutting portion 16A of the cutting portion 16. Similar to the attaching portion 14, in the lateral cutting portion 16A, the release paper 54 is peeled off from the adhesive layer 53 of the base paper 52. In addition, the release paper 54 that is peeled off from the adhesive layer 53 of the base paper 52 is guided to the guide roll 32, is wound around the guide rolls 34 and 36, and is further guided to the guide roll 38.

On the other hand, according to the transporting of the base paper 52 in which the release paper 54 is peeled off, cutting in the lateral direction with respect to each label area 58 of the base paper 52 is subsequently performed using the cutter 40. Thereby, the amorphous magnetic wire 56 that is disposed on the adhesive layer 53 of the base paper 52 along the transporting direction is cut along with the base paper 52 (cutting process). Moreover, after the cutting, the release paper 54 is reattached to the adhesive layer 53 of the base paper 52 using the guide roll 38.

Continuously, the label paper 60 to which the release paper 54 is reattached is transported to the longitudinal cutting portion 16B of the cutting portion 16. In the longitudinal cutting portion 16B, according to the transporting of the label paper 60, cutting in the longitudinal direction with respect to each label area 58 of the base paper 52 is subsequently performed using the cutter 42 (cutting process). Moreover, at this time, cutting of the release paper 54 is not performed. That is, the cutter 42 cuts only the base paper 52.

In this way, if the cutting in the lateral direction and longitudinal direction of each label area 58 of the label paper 60 is performed (if the label 64 is cut from the label paper 60), the unnecessary portion 62 of the base paper 52 that is not used for the label 64 is peeled off from the release paper 54 and removed using the removal portion 20 (removal process). Thereby, the label assembly 66 in which the plural labels 64 are arranged on the release paper 54 with a constant interval is manufactured (refer to FIG. 4), and the label assembly 66 is cut for each predetermined length using the cutter 41 and is recovered in the recovery portion 18.

On the other hand, the unnecessary portion 62 of the base paper 52 which is peeled off from the release paper 54 is guided to the winding portion 46 by the guide roll 44. In addition, during the guidance, it is detected whether or not the label 64 is present in the unnecessary portion 62 of the base paper 52 using the laser sensor 48 (detection process). That is, the label area 58 in the unnecessary portion 62 passes through the laser light L, which is radiated from the light emitting portion 48A and is received by the light receiving portion 48B, at a regular speed.

Here, for example, as shown in FIG. 6A, when the amorphous magnetic wire 56 is appropriately cut using the cutter 40 and the label 64 is removed from the label area 58, shielding of the laser light L is carried out only by the unnecessary portion 62 between the label 64 and the label 64.

However, for example, as shown in FIG. 6B, when the label 64 is not removed from the label area 58 due to cutting failure of the cutter 40 with respect to the amorphous magnetic wire 56, shielding of the laser light L is carried out by the unnecessary portion 62 and the label 64 which is not removed from the label area 58.

That is, non-light receiving time of the laser light L through the light receiving portion 48B of the unnecessary portion 62 shown in FIG. 6B may be longer than that of the unnecessary portion 62 shown in FIG. 6A. Thereby, the label 64 being included in the unnecessary portion 62 is detected, and it is detected that a defective unit occurs (at least a portion of the labels 64 is not present) in the label assembly 66 which is recovered to the recovery portion 18.

In this way, if it is detected that "there is an error" in the unnecessary portion 62, the label manufacturing apparatus 10 is temporarily stopped (stopping process). Thereby, since the label assembly 66 which is determined as a detective unit is recovered on the uppermost layer in the recovery portion 18, the detective unit can be rapidly removed. Therefore, productivity of the label 64 which is a product is improved.

Figure 7:
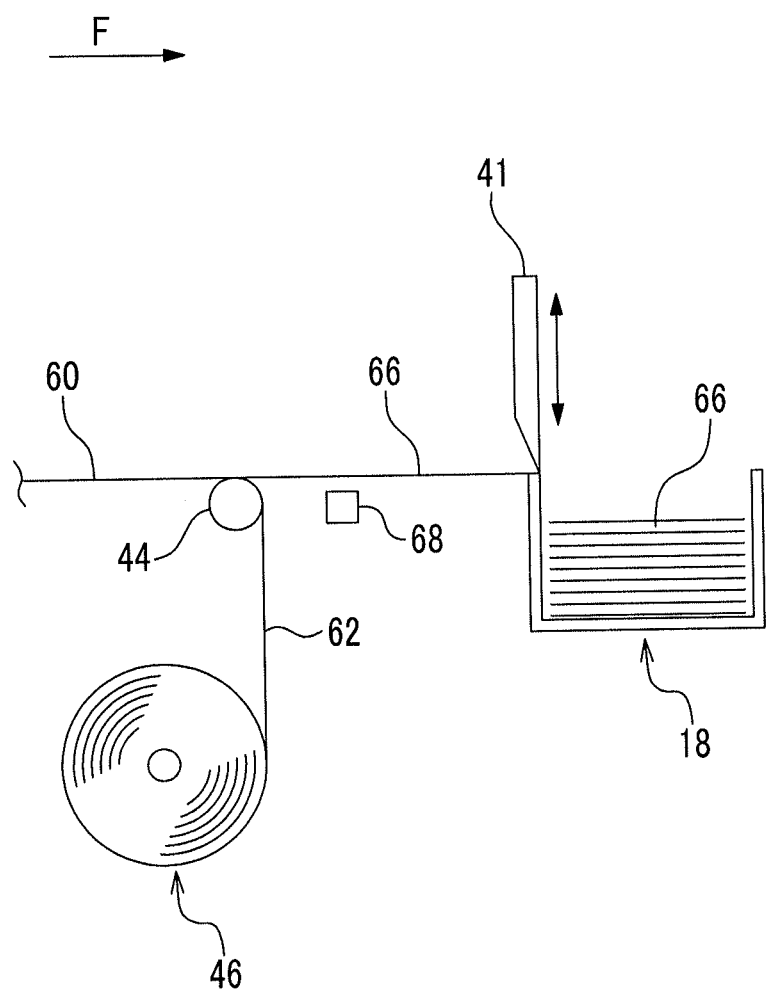
FIG. 7 is an explanatory view showing a state where the label paper in which the unnecessary portion of the base paper has been removed is detected using a CCD image sensor.

In addition, whether or not the label 64 is present in the unnecessary portion 62 is not detected using the laser sensor 48, as shown in FIG. 7, a CCD image sensor 68 which is an example of a detection unit is disposed between the guide roll 44 and the recovery portion 18, and it is detected whether or not the label 64 is present in the label paper 60 (label assembly 66), in which the unnecessary portion 62 is peeled off, using the CCD image sensor 68.

In this case, if the label 64 is present at a position in which the label 64 of the label assembly 66 is to be present, it is determined as an "OK state", that is, it is determined that "there is no error", and if the label 64 is not present, it is determined as an "unsatisfactory state", that is, it is determined that "there is an error". Moreover, if it is detected that "there is an error" due to the CCD image sensor 68, the label manufacturing apparatus 10 is temporarily stopped (stopping process), and the label assembly 66 which is determined as the detective unit is removed. Thereby, productivity of the label 64 is improved.

As described above, the manufacturing method of the label 64 and the label paper 60 according to the present exemplary embodiment are described. However, the manufacturing method of the label 64 and the label paper 60 according to the present exemplary embodiment are not limited to the shown those, and the design can be appropriately changed within a scope which does not depart from the gist of the present invention. For example, the recovery portion 18 may be configured so that the label assembly 66 is wound in a roll shape and is recovered.

In addition, the detection unit is not limited to the laser sensor 48 or the CCD image sensor 68. For example, when it is detected whether or not the label 64 is present in the label paper 60 (label assembly 66) in which the unnecessary portion 62 is peeled off, the detection unit may be a detection unit which detects a step (thickness of the label 64) between the release paper 54 and the label 64 and may be a detection unit which detects whether or not a metal (amorphous magnetic wire 56) is disposed on the release paper 54 with regularity.

Moreover, the magnetic member is not limited to the amorphous magnetic wire 56. For example, the magnetic member may be a belt-shaped amorphous magnetic body (not shown) in which the width is 2 mm or less. Moreover, the magnetic member may be a single wire in which plural amorphous magnetic wires 56 are twisted. In addition, the amorphous magnetic wire 56 is not limited to the amorphous magnetic wire which is disposed along the transporting direction of the base paper 52.

Moreover, the amorphous magnetic wire 56 may be configured so as to be embedded to the label 64. That is, the base paper 52 is configured by a two-layer structure without the adhesive layer 53, and the amorphous magnetic wire 56 may be disposed between the layers. When the amorphous magnetic wire is configured as above, since it is more difficult to recognize the amorphous magnetic wire 56 from the outside, the amorphous magnetic wire becomes more desirable.

That is, if the label 64 is the label in which it is difficult to recognize the amorphous magnetic wire 56 from the outside, since it is more difficult to understand that a security function is mounted on an article to which the label 64 is attached, it is possible to suppress or prevent the security function (amorphous magnetic wire 56) from being illegally removed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A manufacturing method of a label, comprising:
configuring a member for the label so as to dispose a magnetic member between a base material and a covering material;
cutting the magnetic member along with the base material so as to cut the label from the member;
removing an unnecessary portion of the base material from the member;
detecting whether or not the label is present in the unnecessary portion of the base material or whether or not the label is present in the member in which the unnecessary portion of the base material has been removed;
determining that an error has occurred if it is detected that the label is present in the unnecessary portion of the base material in the detecting; and
stopping the configuring, the cutting, and the removing if it is determined that the error has occurred.

2. The manufacturing method according to claim 1, wherein the magnetic member is disposed along a transporting direction of the base material in the configuring.

3. The manufacturing method according to claim 1, wherein the configuring, the cutting, and the removing are stopped if it is detected that the label is not present in the member in which the unnecessary portion of the base material has been removed in the detecting.

4. The manufacturing method of according to claim 2, wherein the configuring, the cutting, and the removing are stopped if it is detected that the label is not present in the member in which the unnecessary portion of the base material has been removed in the detecting.

5. The manufacturing method according to claim 1, further comprising:
radiating light from a light emitting portion to a light receiving portion, the member being disposed between the light emitting portion and the light receiving portion;
detecting that the label is present in the unnecessary portion of the base material when the light receiving portion does not receive the light radiated from the light emitting portion; and
detecting that the label is present in the member in which the unnecessary portion of the base material has been removed when the light receiving portion receives the light radiated from the light emitting portion.

6. The manufacturing method according to claim 5, further comprising:
guiding the unnecessary portion of the base material along a first transporting path; and
guiding the member without the unnecessary portion of the base material along a second transporting path, wherein both of the radiating and the detecting are performed in the first transporting path.

\* \* \* \* \*